United States Patent
Kuang et al.

(10) Patent No.: US 10,992,581 B2
(45) Date of Patent: Apr. 27, 2021

(54) METHODS AND DEVICES FOR OPTIMIZING LOAD BALANCING BASED ON CLOUD MONITORING

(71) Applicant: PING AN TECHNOLOGY (SHENZHEN) CO., LTD., Shenzhen (CN)

(72) Inventors: Guangcai Kuang, Shenzhen (CN); Renjie Yi, Shenzhen (CN)

(73) Assignee: PING AN TECHNOLOGY (SHENZHEN) CO., LTD., Shenzhen (CN)

(*) Notice: Subject to any disclaimer, the term of this patent is extended or adjusted under 35 U.S.C. 154(b) by 426 days.

(21) Appl. No.: 16/075,327

(22) PCT Filed: Oct. 24, 2017

(86) PCT No.: PCT/CN2017/107480
§ 371 (c)(1),
(2) Date: Aug. 3, 2018

(87) PCT Pub. No.: WO2019/061615
PCT Pub. Date: Apr. 4, 2019

(65) Prior Publication Data
US 2021/0036957 A1    Feb. 4, 2021

(30) Foreign Application Priority Data
Sep. 28, 2017  (CN) .......................... 201710903413.4

(51) Int. Cl.
*H04L 12/26* (2006.01)
*H04L 12/803* (2013.01)
*H04L 29/08* (2006.01)

(52) U.S. Cl.
CPC ........ *H04L 47/125* (2013.01); *H04L 43/0823* (2013.01); *H04L 67/1004* (2013.01)

(58) Field of Classification Search
None
See application file for complete search history.

(56) References Cited

U.S. PATENT DOCUMENTS

2010/0174886 A1    7/2010  Kimelman et al.
2010/0223364 A1*   9/2010  Wei ........................ H04L 47/125
                                                              709/220

(Continued)

FOREIGN PATENT DOCUMENTS

CN    103401948       11/2013
CN    104283948 A      1/2015

(Continued)

OTHER PUBLICATIONS

Office Action dated Oct. 29, 2019 from corresponding application No. JP 2018-517171.

(Continued)

*Primary Examiner* — Phirin Sam
(74) *Attorney, Agent, or Firm* — Hauptman Ham, LLP

(57) ABSTRACT

Disclosed is a method and a device for optimizing load balancing based on cloud monitoring that relate to loading balancing and that can improve the primary/backup Availability Zone (AZ) switchover efficiency of an load balancing instance by intelligently switching the preferences of load balancing devices. The method includes: obtaining statistics on traffic distribution within a controlled area of a load balancing system, statistics on backend servers within a plurality of AZs of the load balancing system, and monitored network quality of the AZs; determining an AZ suitable to serve as a corresponding primary AZ of a load balancing instance based on the traffic distribution statistics, the backend server statistics, and the monitored network quality; and performing a primary AZ switchover of the load balancing (Continued)

instance based on the determined result. The present application is intended for the optimizing of load balancing.

17 Claims, 5 Drawing Sheets

(56) References Cited

U.S. PATENT DOCUMENTS

| | | | | |
|---|---|---|---|---|
| 2013/0091252 | A1* | 4/2013 | Pizzorni | H04L 69/329 |
| | | | | 709/219 |
| 2015/0215269 | A1 | 7/2015 | Chong et al. | |
| 2016/0149763 | A1* | 5/2016 | Ingram | H04L 41/0806 |
| | | | | 709/224 |
| 2017/0199770 | A1* | 7/2017 | Peteva | G06F 9/5088 |
| 2017/0272317 | A1* | 9/2017 | Singla | H04W 24/08 |
| 2018/0048666 | A1* | 2/2018 | Alderson | H04L 45/20 |
| 2020/0296125 | A1* | 9/2020 | Alderson | H04L 63/0227 |

FOREIGN PATENT DOCUMENTS

| | | |
|---|---|---|
| CN | 106330743 | 1/2017 |
| CN | 106469091 A | 3/2017 |
| CN | 106488507 | 3/2017 |
| CN | 107196869 A | 9/2017 |
| JP | 2013513860 | 4/2013 |
| JP | 2015153370 | 8/2015 |
| JP | 2015153402 | 8/2015 |
| JP | 2015184879 | 10/2015 |
| WO | 2016075671 A1 | 5/2016 |

OTHER PUBLICATIONS

International search report dated Dec. 28, 2017 from corresponding application No. PCT/CN2017/107480.

Chinese Office Action issued in corresponding Chinese Application No. 201710903413.4, dated Aug. 23, 2019, pp. 1-7, State Intellectual Property Office of P.R. China, Beijing, China.

Australian Examination Report issued in corresponding Australian Application No. 2017404564, dated Sep. 2, 2019, pp. 1-4, IP Australia Patent Office, Phillip, Australia.

* cited by examiner

METHODS AND DEVICES FOR OPTIMIZING LOAD BALANCING BASED ON CLOUD MONITORING

RELATED APPLICATIONS

The present application is a National Phase of International Application Number PCT/CN2017/107480, filed Oct. 24, 2017, and claims the priority of China Application No. 201710903413.4, filed Sep. 28, 2017.

TECHNICAL FIELD

The present application relates generally to the technical field of load balancing, and more particularly relates to methods and devices for optimizing load balancing based on cloud monitoring.

BACKGROUND

Efficient and accurate load balancing and scheduling technology is the foundation for the actual operations of cloud computing and large-scale application systems. Load balancing can enable the cloud computing platform to run stably and efficiently to fulfill high-volume concurrent requests, thus playing an important role in cloud computing and large-scale application systems. In the field of cloud computing, the so-called load balancing mainly refers to distributing a large number of client requests that arrive over a short period of time across multiple backend servers in a balanced and reasonable manner.

Load balancing systems of most current public clouds, however, support only primary/backup HA (High Availability) technology. When switching between primary and backup Availability Zones (AZ's), the route preferences of load balancing devices need to be adjusted manually; for example, a preference value filled in each AZ at the time of launching and routing of a load balancing instance needs to be modified manually. Then the route preferences are based on to make a decision on to which AZ the load balancing instance is to be distributed, thereby achieving the purpose of switching.

However, by manually adjusting the route preferences of load balancing devices, the primary/backup AZ switchover efficiency of the load balancing instance may be affected and the intelligent switching of the preferences of load balancing devices cannot be fulfilled. Furthermore, misoperations are also possible, affecting the primary/backup AZ switchover accuracy.

SUMMARY

In view of the above, the present application provides methods and devices for optimizing load balancing based on cloud monitoring, in order to solve the problems present in manually adjusting the route preferences of load balancing devices that the primary/backup AZ switchover efficiency of the load balancing instance is affected and the intelligent switching of the preferences of load balancing devices cannot be fulfilled, and that misoperations are also possible affecting the primary/backup AZ switchover accuracy.

According to an aspect of the present application, a method for optimizing load balancing based on cloud monitoring is provided, the method including the following operations. Statistics on traffic distribution within a controlled area of a load balancing system are obtained. Also, statistics on backend servers within Availability Zones (AZ's) of the load balancing system, as well as monitored network quality of these AZs are obtained. Then an AZ suitable to serve as a corresponding primary AZ of a load balancing instance is determined based on the traffic distribution statistics, the backend serverstatistics, and the monitored network quality. As such, a primary AZ switchover of the load balancing instance is performed in accordance with the determined result.

According to another aspect of the present application, a device for optimizing load balancing based on cloud monitoring is provided, the device including: an acquisition unit that obtains statistics on traffic distribution within a controlled area of a load balancing system, statistics on backend servers within Availability Zones (AZ's) of the load balancing system, as well as monitored network quality of these AZs; a determination unit that determines an AZ suitable to serve as a corresponding primary AZ of a load balancing instance based on the traffic distribution statistics, the backend server statistics, and the monitored network quality that are obtained by the acquisition unit; an a switching unit that performs a primary AZ switchover of the load balancing instance in accordance with the determined result of the determination unit.

According to yet another aspect of the present application, a storage device is provided that stores a computer program which when executed by a processor performs the above-described method for optimizing load balancing based on cloud monitoring.

According to still another aspect of the present application, a physical apparatus for optimizing load balancing based on cloud monitoring is provided. The physical apparatus includes a storage device, a processor, and a computer program stored on the storage device and executable by the processor. The processor is configured to execute the computer program to perform the above-described method for optimizing load balancing based on cloud monitoring.

In contrast with the current methods in which the route preferences of load balancing devices are manually adjusted, the present application, by the method and device for optimizing load balancing based on cloud monitoring in accordance with the above technical solutions, makes a comprehensive analysis based on the traffic distribution statistics within the controlled area of the load balancing system, the backend serverstatistics within various AZs of the load balancing system, and the monitored network quality of these AZs, and based on such an analysis determines an AZ suitable to serve as a corresponding primary AZ of a load balancing instance, and then automatically performs a primary/backup AZ switchover of the load balancing instance. Therefore, the primary/backup AZ switchover efficiency of the load balancing instance can be improved fulfilling the ability to intelligently switch the preferences of the load balancing devices so that services can be migrated to the AZ as appropriate. Furthermore, misoperations can be avoided improving the primary/backup AZ switchover accuracy of the load balancing instance.

The foregoing description is merely an overview of the technical solutions of the present application. In order that the technical means of the present application can be better understood so that they can be practiced in accordance with the contents of this specification and in order that the above and other objects, features, and advantages of the present application can be more clearly and easily understood, specific implementations of the present application are provided below.

BRIEF DESCRIPTION OF THE ACCOMPANYING DRAWINGS

Various other advantages and benefits will become apparent to those having ordinary skill in the art upon reading the following detailed description of some exemplary embodiments. The accompanying drawings are intended for the sole purpose of illustrating the exemplary embodiments and are not to be construed as limiting the present application. Throughout the drawings, the same reference numerals will be used to refer to the same components or parts. In the drawings.

DETAILED DESCRIPTION OF ILLUSTRATIVE EMBODIMENTS

Hereinafter, exemplary embodiments of the present disclosure will be described in more detail with reference to the accompanying drawings. Although the some exemplary embodiments of the present disclosure are shown in the accompanying drawings, it will be appreciated that the disclosure may be implemented in various other forms and will not be limited to the embodiments set forth herein. Rather, these embodiments are provided for a more thorough understanding of the present disclosure, so that the scope of the disclosure will be more fully conveyed to those having skill in the art.

Figure 1:
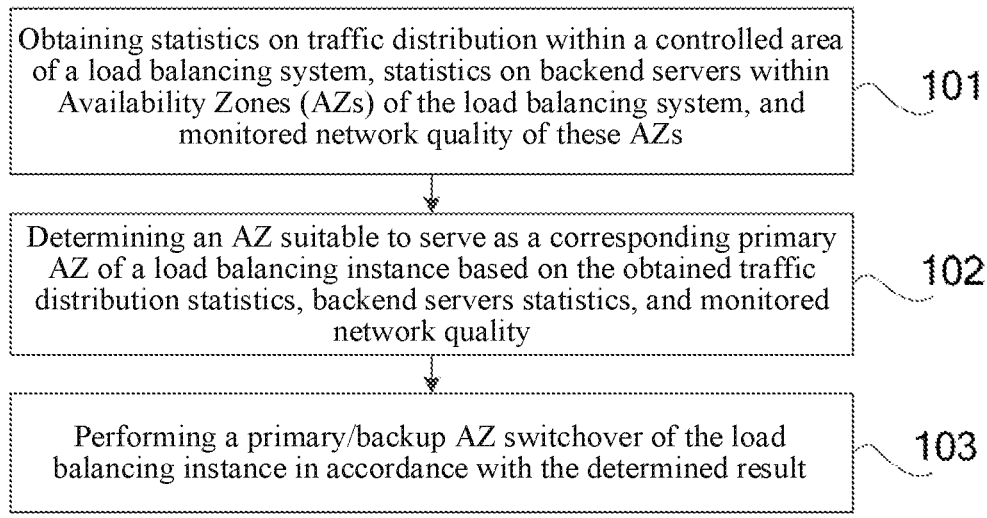
FIG. 1 is a flowchart of a method for optimizing load balancing based on cloud monitoring according to an embodiment of the present application.

Embodiments of the present application provide a method for optimizing load balancing based on cloud monitoring, which can improve the primary/backup AZ switchover efficiency of a load balancing instance by intelligently switching the preferences of load balancing devices so that services can be migrated to the Availability Zone (AZ) as appropriate. As illustrated in FIG. 1, the method includes the following blocks which begin at block 101.

In 101, statistics on traffic distribution within a controlled area of a load balancing system, statistics on backend servers within multiple AZs of the load balancing system, as well as monitored network quality of these AZs are obtained.

The area controlled by the load balancing system may be a collection of Internet Data Center (IDC) machine rooms in a city or a specific region, and may be composed of multiple IDC machine rooms within the same city or the same region.

For example, the traffic condition of public network load balancing systems of the IDC machines rooms within the entire city or region can be altogether gathered to obtain the traffic distribution statistics. The traffic distribution statistics may include information such as a traffic usage rate and a total bandwidth of each AZ. The backend server statistics on each AZ can be obtained through a health check on the backend servers within this AZ of the load balancing system, and may include the number of backend servers operating in their normal state in this AZ. The network quality conditions of various AZs can be obtained by a statistical approach based on the operation data of the monitored network quality of each AZ, and may specifically include various network quality conditions such as delay, packet loss rate, jitter, and out-of-order.

Executive body of this embodiment can be a device for optimizing load balancing based on cloud monitoring. The device can intelligently switch the preferences of load balancing devices by making a comprehensive analysis factoring in the realtime traffic distribution statistics within the controlled area of the load balancing system, the realtime backend server statistics within various AZs of the load balancing system, and the realtime monitored network quality of each AZ, thereby fulfilling automatic primary/backup AZ switchover of a load balancing instance, specifically by carrying out the process of blocks 101 to 103. The method then proceeds to block 102.

In 102, an AZ suitable to serve as a corresponding primary AZ of a load balancing instance is determined based on the obtained traffic distribution statistics, backend server statistics, and monitored network quality.

For example, the obtained traffic distribution statistics can first be based on to determine the instant traffic usage rate and total bandwidth of each AZ. Then the backend server statistics can be used to determine the number of backend servers currently operating in a normal state in each AZ. Then the monitored network quality may be based on to determine abnormalities that have occurred in each AZ. Finally, an AZ N currently with a relatively low traffic usage rate and a relatively high total bandwidth as well as relatively more normal backend servers and few abnormalities can be selected as the AZ suitable to serve as the corresponding primary AZ of the load balancing instance. The method then continues to block 103.

In 103, a primary/backup AZ switchover of the load balancing instance is performed in accordance with the determined result.

For example, if the current AZ N is suitable to serve as the corresponding primary AZ of the load balancing instance, then when this load balancing instance is being distributed and routed, an appropriate preference value may be automatically filled in so that the load balancing instance can be distributed to the AZ N for processing, fulfilling the automatic primary/backup AZ switchover of the load balancing instance.

The above embodiment provides a method for optimizing load balancing based on cloud monitoring. In contrast with the current methods in which the route preferences of load balancing devices are manually adjusted, the present embodiment makes a comprehensive analysis based on the traffic distribution statistics within the controlled area of the load balancing system, the backend server statistics within various AZs of the load balancing system, and the monitored network quality of these AZs, and based on such an analysis determines an AZ suitable to serve as a corresponding primary AZ of a load balancing instance, and then automatically performs a primary/backup AZ switchover of the load balancing instance. Thus, the primary/backup AZ switchover efficiency of the load balancing instance can be improved fulfilling the ability to intelligently switch the preferences of load balancing device so that services can be migrated to the AZ as appropriate. Furthermore, misoperations can be avoided improving the primary/backup AZ switchover accuracy of the load balancing instance.

Figure 2:
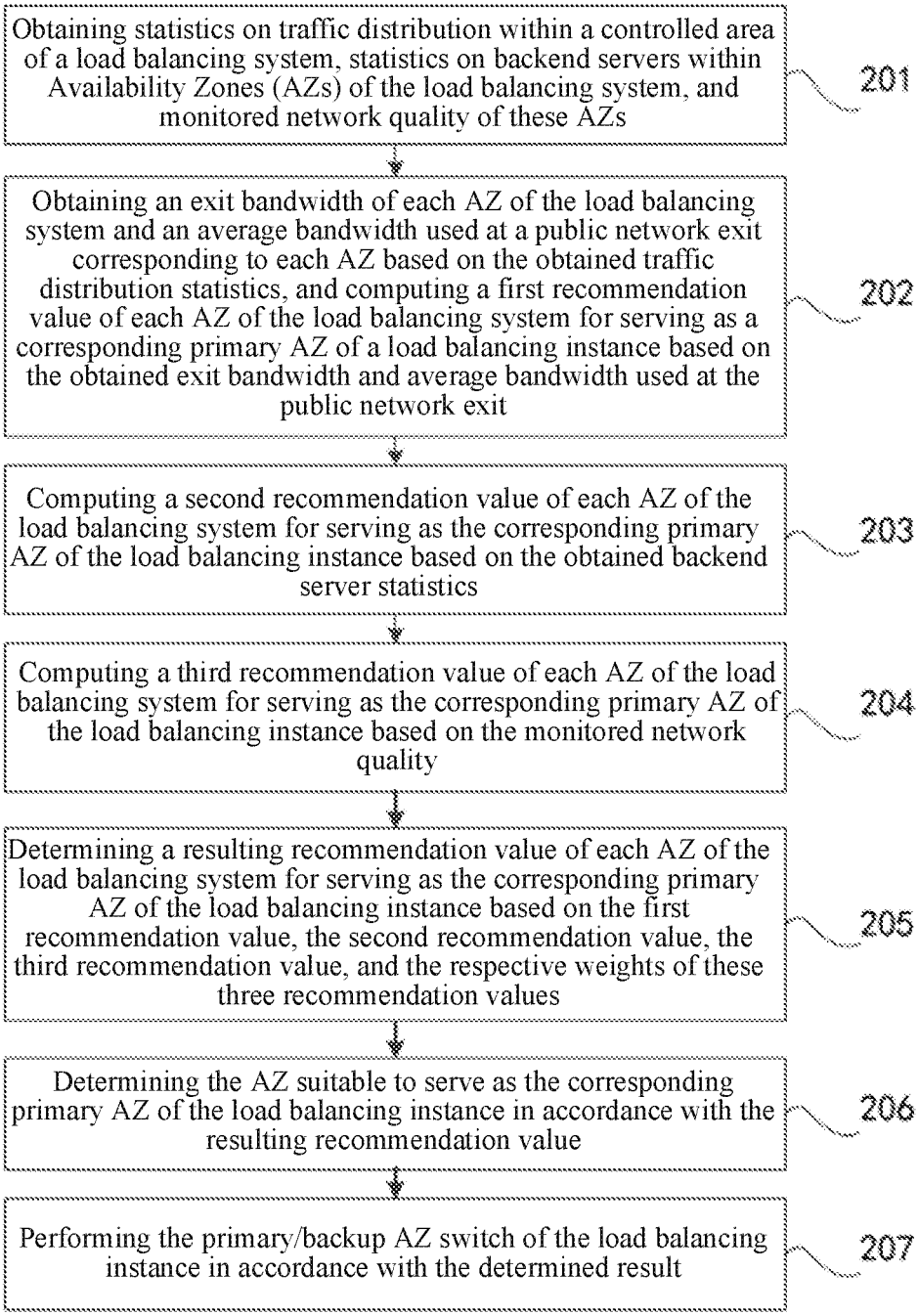
FIG. 2 is a flowchart of a method for optimizing load balancing based on cloud monitoring according to another embodiment of the present application.

As refinement and expansion of the above embodiment, another method for optimizing load balancing based on cloud monitoring is further provided, the method including the following blocks which begin at block 201, as illustrated in FIG. 2.

In 201, statistics on traffic distribution within a controlled area of a load balancing system, statistics on backend servers within multiple AZs of the load balancing system, as well as monitored network quality of these AZs are obtained.

Specifically, the block of obtaining the backend server statistics within the multiple AZs of the load balancing system may include: determining the number of backend servers operating in a preset normal condition in each of the AZs through a health check on the backend servers; and determining the backend server statistics within the multiple AZs of the load balancing system based on this number. The preset normal condition may be configured in advance according to the actual requirements of the health check.

Health check is a very important function in load balancing services. A load balancing device needs to perform a health check to detect whether an backend server is normally providing service before forwarding traffic to this backend server. If the health check on a backend server in an abnormal state succeeds for a consecutive number of times that reaches a "health check normality threshold", then this backend server will considered to have returned to its normal state and traffic will start to be forwarded to the backend server. If the health check on a backend server in its normal state fails for a consecutive number of times that reaches a "health check abnormality threshold", then this backend server will be considered to be in an abnormal state, and so traffic will be stopped from being forwarded to this backend server.

By the health check on the backend servers, the number of backend servers operating in their normal state that are present in each AZ can be determined, so that the backend server statistics within the multiple AZs of the load balancing system can be determined based on these numbers. The method then proceeds to block 202.

In 202, the obtained traffic distribution statistics is based on to acquire an exit bandwidth of each AZ of the load balancing system as well as an average bandwidth used at a public network exit corresponding to this AZ. Then the acquired exit bandwidth and average bandwidth used at the public network exit are based on to compute a first recommendation value of each AZ of the load balancing system for serving as a corresponding primary AZ of a load balancing instance.

For example, the controlled area can be city A, and statistics on the traffic of public network load balancing systems of IDC machine rooms within the entire city A can altogether be gathered. For example, there are a number of N AZs in this area, which are AZ1, AZ2, . . . , and AZn, respectively; the exit bandwidths of these AZs are B1, B2, . . . , and Bn, respectively; and the currently statistically gathered daily average bandwidths used at the public network exits are B_Ave1, B_Ave2, . . . , and B_AveN, respectively.

Computing the first recommendation value of each AZ of the load balancing system for serving as the corresponding primary AZ of the load balancing instance based on the acquired exit bandwidth and average bandwidth used at the public network exit may include the following operations. The average bandwidth used at the public network exit corresponding to each AZ is divided by the exit bandwidth of this AZ to obtain a traffic usage rate of this AZ. The total bandwidth of the AZ is then multiplied by a preset coordination factor coefficient to obtain a corresponding weight of this AZ. Then the first recommendation value of each AZ of the load balancing system for serving as the corresponding primary AZ of the load balancing instance is determined by the following principle: the lower the traffic usage rate the higher the recommendation value, and the heavier the weight the higher the recommendation value. The preset coordination factor coefficient may be set by in advance a technician according to the actual situation.

For example, in connection with the above example, the traffic usage rate of each AZ can be computed by the following formula:

$$V(1, \ldots, n) = F\left(\frac{B_{Ave1}}{B1}, \ldots, \frac{B_{Aven}}{Bn}\right)$$

The multiple AZs are sorted by sizes of their traffic usage rates. That means, if the traffic usage rates of two AZs are the same, then the AZ with a larger total bandwidth would be put nearer to the top than the other AZ. Based on the sorted result, corresponding recommendation reference values are then assigned to these AZs according to the following principle: the nearer to the top an AZ comes, the greater a reference value will be allocated to this AZ. Afterwards, each AZ can be scored by its weight. For example, the total bandwidth of AZ1 may be 1G while the total bandwidth of AZ2 may be 2G, so according to the principle that the larger the total bandwidth the heavier the weight, plus the coordination factor r, the weight of AZ1 would be r*1 and the weight of AZ2 be r*2. Finally, the recommendation reference value assigned to each AZ is multiplied by the corresponding weight to obtain the recommendation value Ra.

In this manner, the conditions of the current traffic usage rate and total bandwidth of each AZ can be fully considered, so that a suitable primary AZ can be recommended for the load balancing instance according to the principle that of any two AZs the AZ with a relatively lower traffic usage rate will be recommended first and the AZ with a relatively larger total bandwidth will be recommended first. The method then continues to block 203.

In 203, a second recommendation value of each AZ of the load balancing system for serving as the corresponding primary AZ of the load balancing instance is computed based on the obtained backend server statistics.

The second recommendation value of each AZ of the load balancing system for serving as the corresponding primary AZ of the load balancing instance may be determined by the principle that the greater the number, the higher the recommendation value.

For example, based on the number of backend servers operating in their normal state in each AZ and by the principle that the greater the number the higher the recommendation value, a recommendation value Rb can be assigned to each AZ for switching to this AZ. For example, suppose there are 6 normal and available backend servers in AZ1 and 2 normal available backend servers in AZ2, then the recommendation value for switching to AZ1 would be larger than the recommendation value for switching to AZ2.

In this manner, the number of normal available backend servers in each AZ (i.e., the distribution of normal available backend servers within the AZs) can be fully considered, so that a suitable primary AZ can be recommended to the load balancing instance according to the following principle: the more the normal available backend servers, the stronger the processing capability. The method then proceeds to block 204.

In 204, a third recommendation value of each AZ of the load balancing system for serving as the corresponding primary AZ of the load balancing instance is computed based on the monitored network quality.

Specifically, the number of times the network quality parameters of each AZ go abnormal during an operation period may be counted based on gathered operation data of the monitored network quality. The third recommendation value of each AZ of the load balancing system for serving as the corresponding primary AZ of the load balancing instance can then be determined by the principle that the greater the number of abnormalities, the smaller the recommendation value.

For example, the network quality condition of each AZ can be obtained by a statistical approach based on the operation data of the monitored network quality, and may specifically include network quality parameters such as network delay, DNS resolution delay, packet loss rate, jitter, and out-of-order. According to the operation period, the historical data can be gathered, including the number of abnormal conditions occurring within the AZs, such as long network delay, long DNS resolution delay, large packet loss rate, jitter, or out-of-order. Then, by the principle that the greater the number of abnormalities, the smaller the recommendation value, a recommendation value Rc can be obtained for switching to each AZ.

In this way, the abnormal conditions in each AZ can be fully considered, so that a suitable primary AZ can be recommended for the load balancing instance according to the principle for reducing the occurrence of abnormalities. The method then proceeds to block 205.

In 205, a resulting recommendation of each AZ of the load balancing system for serving as the corresponding primary AZ of the load balancing instance is determined based on the computed first recommendation value, second recommendation value, and third recommendation value, as well as the respective weights of the three recommendation values.

Specifically, the computed first recommendation value can be multiplied by a weight corresponding to the first recommendation value. The product obtained can then be added to the product of the second recommendation value timing a weight corresponding to the second recommendation value and the product of the third recommendation value timing a weight corresponding to the third recommendation value. The sum obtained as such would then be determined as the resulting recommendation value of each AZ of the load balancing system for serving as the corresponding primary AZ of the load balancing instance.

For example, in connection with the above example in which the three recommendation values Ra, Rb, and Rc are respectively obtained in blocks 202 to 204, the final resulting recommendation value can be obtained using the formula Rating=Ra*wa+Rb*wb+Rc*wc, where Rating represents the resulting recommendation value for switching to the present AZ, wa is a corresponding weight of the first item, wb is a corresponding weight of the second item, and we is a corresponding weight of the third item.

Therefore, according to the actual situation, different factors can be given different weighted considerations, whereby an accurate recommendation value for switching to each AZ can be computed. The method then proceeds to block 206.

In 206, an AZ suitable to serve as the corresponding primary AZ of the load balancing instance is determined based on the resulting recommendation value.

Specifically, the AZ with the highest resulting recommendation value, or an AZ with a resulting recommendation value higher than a preset threshold recommendation value can be determined as the AZ suitable as the corresponding primary AZ of the load balancing instance.

For example, the AZ A with the highest resulting recommendation value may be determined as the AZ suitable to serve as the corresponding primary AZ of the load balancing instance. Alternatively, a certain threshold recommendation value may be set in advance, and all the AZs each having the resulting recommendation value higher than the threshold recommendation value may be eligible, so that one AZ can be selected therefrom as the AZ suitable to serve as the corresponding primary AZ of the load balancing instance.

To meet different service requirements, in an optional embodiment of the present application, the multiple AZs can also be scored according to the resulting recommendation values, so that an AZ suitable to serve as the primary AZ can be recommended to the user based on the resulting scores, and the user can decide which AZ will be selected to serve as the primary AZ of the load balancing instance. For example, the scores that lie in the range of 1-100 points may be assigned according to the resulting recommendation values, and the AZs may further be divided into different sections by their scores, with the recommendation strength of each section being given and explained. For example, if an AZ earns a score higher than 80 points, then it may be strongly recommended to set the primary AZ of the load balancing instance as this AZ. The method then continues to block 207.

In 207, a primary/backup AZ switchover of the load balancing instance is performed in accordance with the determined result.

Figure 3:
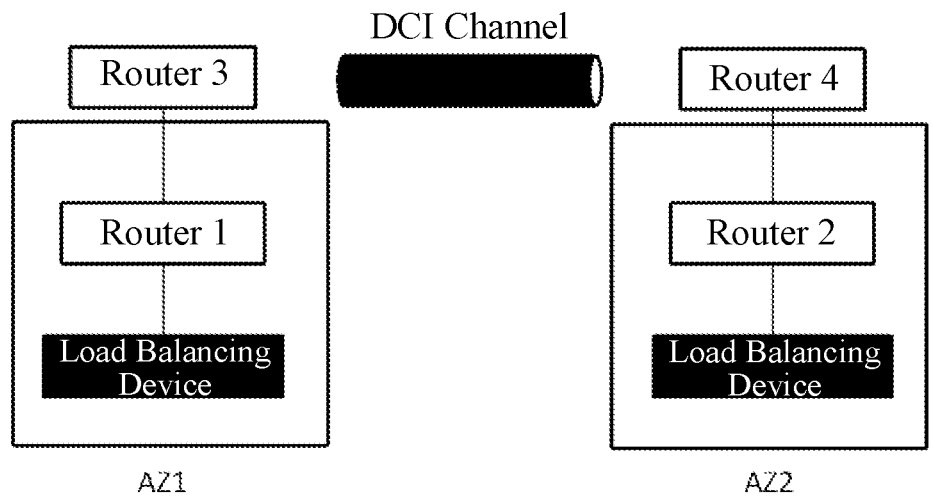
FIG. 3 is a schematic diagram of an example architecture of an Availability Zone (AZ) according to an embodiment of the present application.

Most current load balancing systems use dynamic routing protocols to distribute 32-bit host routes. For example, a load balancing instance configured on a load balancing device may be advertised to a router through 32-bit routing. Since this router needs to maintain 32-bit routes, too many system resources will be consumed by this solution. FIG. 3 illustrates a dual-AZ configuration deployed in different places of a same city. A Datacenter Interconnection (DCI) channel is used for interconnecting the machines rooms of two AZs. Router 3 and Router 4 belong to the backbone network of the local area and are used for direct connections to the Internet. Router 3 and Router 4 are connected through a DCI channel. Router 1 and Router 2 belong to the internal datacenter networks of AZ1 and AZ2, respectively. In the traditional solution, a load balancing instance (a certain VIP) configured on the load balancing devices is advertised to Router 1 and Router 2 through 32-bit routing. As such, every time a new load balancing instance is added, a new 32-bit route needs to be advertised to Router 1 and Router 2. This 32-bit route needs to be maintained on Router 1 and Router 2, so this solution consumes too many system resources.

Figure 4:
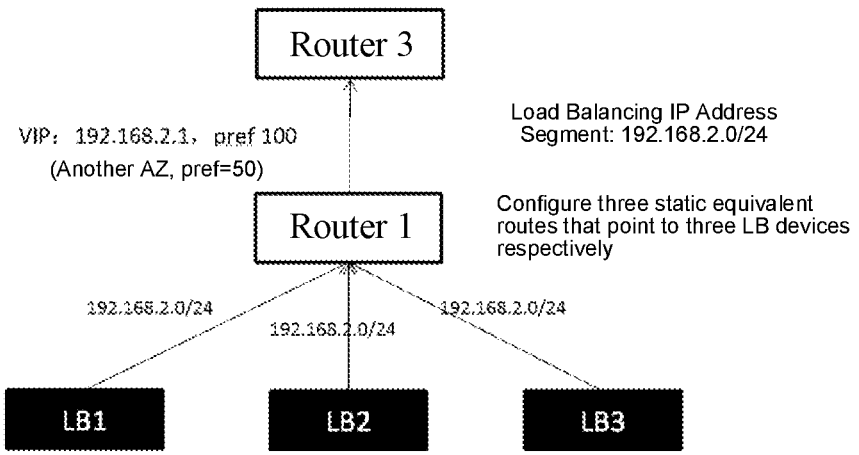
FIG. 4 is a schematic diagram of an example of a primary/backup AZ switchover according to an embodiment of the present application.

In order to solve the above problem to improve the usability of the deployment, this embodiment of the instant application further includes the following operation prior to block 207: pre-distributing a network segment route from the load balancing device to which the load balancing instance belongs to a corresponding router of the load balancing device, by means of configuring a static equivalent route. For example, in connection with the example shown in FIG. 3, a network segment route may be distributed from the load balancing device to Router 1 and Router 2. Then through the network controller, Router 1 and Router 2 can be directly scheduled to distribute the 32-bit route to Router 3 and Router 4. In this way, the original 32-bit route that needs to be maintained on Router 1 and Router 2 would disappear, thereby saving system resources. As illustrated in FIG. 4, there are three load balancing devices LB1, LB2, and LB3 in AZ1, and the three devices form a load balancing resource pool. In this case, on Router 1 the load balancing IP address segment is configured as three static equivalent routes that point to three devices, respectively. Then, according to the configuration requirements of the load balancing instance, the 32-bit route of the load balancing instance may be distributed as required along with the preference value a to Router 3. The same thing is done in AZ2; according to the configuration requirements of the load balancing instance, the 32-bit route of the load balancing instance is distributed as required, with the preference value b, to Router 4.

Accordingly, block 207 may specifically include: switching the primary AZ of the load balancing instance to the AZ indicated in the determined result by adjusting the preference values attached to the corresponding 32-bit route of the load balancing instance when the router is distributing this 32-bit route to backbone network routers, where the backbone network routers of different AZs are connected through DCI channels.

For example, in connection with FIG. 3 and FIG. 4 as well as the foregoing implementation process, the specific action of switching the primary AZ of the load balancing instance can be done by the centralized controller scheduling Router 1 and Router 2, i.e., by automatically adjusting the above preference values a and b so that Router 1 distributes a 32-bit route along with the adjusted preference value a to Router 3, and Router 2 distributes a 32-bit route along with the adjusted preference value b to Router 4, thereby achieving the purpose of automatically switching the primary AZ of the load balancing instance.

Further, in order to help the user finish the automatic switchover of the primary AZ within the specified period, the time period for switching the primary AZ may be given according to operation experience. For example, in general the time suitable for switching is from 11 pm to 6 o'clock in the morning the next day, but some systems may have some special recommended times which may be more suitable. Through the timing operating system on the cloud platform, the operation of switching the AZ of the load balancing instance can be automatically entered. Thus, by the above implementation process, it can be determined to which AZ the primary AZ of the load balancing instance needs to be set, and the operation of switching the primary AZ can be completed automatically within a specified time.

The above embodiment of the present application provides another method for optimizing load balancing based on cloud monitoring, which can improve the primary/backup AZ switchover efficiency of a load balancing instance by intelligently switching the preferences of load balancing devices so that services can be migrated to the AZ as appropriate. Furthermore, misoperations can be avoided improving the the primary/backup AZ switchover accuracy of the load balancing instance and saving system resources.

Figure 5:
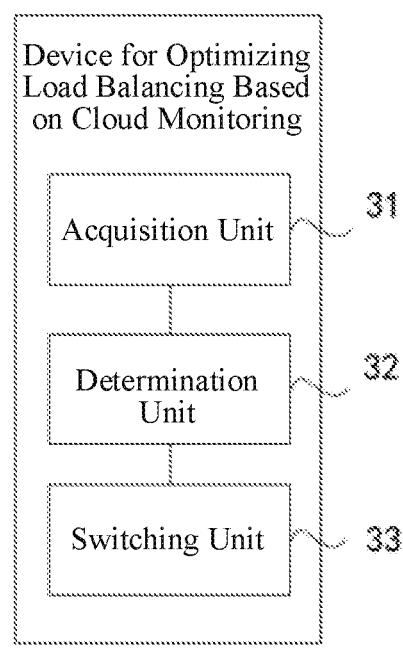
FIG. 5 is a block diagram of a device for optimizing load balancing based on cloud monitoring according to an embodiment of the present application.

As concrete embodiment of the methods illustrated in FIG. 1 and FIG. 2, a device for optimizing load balancing based on cloud monitoring is further provided. As illustrated in FIG. 5, the device includes an acquisition unit 31, a determination unit 32, and a switching unit 33.

Acquisition unit 31 can be configured to obtain statistics on traffic distribution within a controlled area of a load balancing system, statistics on backend servers within multiple AZs of the load balancing system, as well as monitored network quality of these AZs.

Determination unit 32 can be configured to determine an AZ suitable to serve as a corresponding primary AZ of a load balancing instance based on the traffic distribution statistics, the backend server statistics, and the monitored network quality that are obtained by acquisition unit 31.

Switching unit 33 can be configured to perform a primary AZ switchover of the load balancing instance in accordance with the determined result of determination unit 32.

Figure 6:
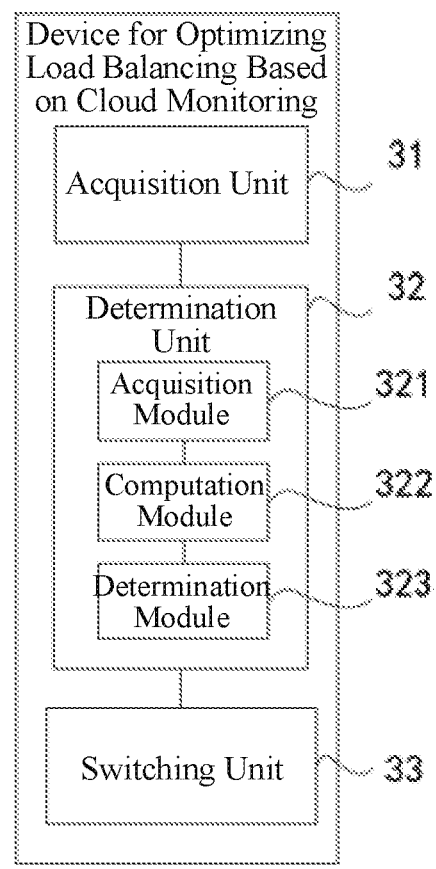
FIG. 6 is a block diagram of a physical apparatus for optimizing load balancing based on cloud monitoring according to an embodiment of the present application.

In a specific application scenario, as illustrated in FIG. 6, determination unit 32 specifically includes an acquisition module 321, a computation module 322, and a determination module 323.

Acquisition module 321 can be configured to obtain an exit bandwidth of each AZ of the load balancing system as well as an average bandwidth used at a public network exit corresponding to each AZ, based on the obtained traffic distribution statistics.

Computation module 322 can be configured to compute a first recommendation value of each AZ of the load balancing system for serving as the corresponding primary AZ of the load balancing instance, based on the exit bandwidth and average bandwidth used at the public network exit.

Computation module 322 can further be configured to compute a second recommendation value of each AZ of the load balancing system for serving as the corresponding primary AZ of the load balancing instance, based on the backend server statistics.

Computation module 322 can further be configured to compute a third recommendation value of each AZ of the load balancing system for serving as the corresponding primary AZ of the load balancing instance, based on the monitored network quality.

Determination module 323 can be configured to determine a resulting recommendation value of each AZ of the load balancing system for serving as the corresponding primary AZ of the load balancing instance, based on the computed first recommendation value, second recommendation value, and third recommendation value, as well as the respective weights of the three recommendation values.

Determination module 323 can further be configured to determine an AZ suitable to serve as the corresponding primary AZ of the load balancing instance based on the resulting recommendation value.

In a specific application scenario, computation module 322 may be specifically configured to: divide the average bandwidth used at the public network exit corresponding to each AZ by the exit bandwidth of this AZ to obtain a traffic usage rate of the AZ; multiply the total bandwidth of the AZ by a preset coordination factor coefficient to obtain a corresponding weight of this AZ; and determine the first recommendation value of each AZ of the load balancing system for serving as the corresponding primary AZ of the load balancing instance by the following principle: the lower the traffic usage rate the higher the recommendation value, and the heavier the weight the higher the recommendation value.

In a specific application scenario, acquisition unit 31 can be specifically configured to determine the number of backend servers operating in their preset normal state in each AZ by a health check on the backend servers; and determine the backend server statistics within the multiple AZs of the load balancing system based on these numbers.

Computation module 322 can be configured to: determine a second recommendation value of each AZ of the load balancing system for serving as the corresponding primary AZ of the load balancing instance by the principle that the greater the number the higher the recommendation value.

In a specific application scenario, computation module 322 can further be configured to: count a number of times the network quality parameters of each AZ go abnormal during an operation period based on operation data of the monitored network quality; and determine the third recommendation value of each AZ of the load balancing system for serving as the corresponding primary AZ of the load balancing instance by the principle that the greater the number of abnormalities the smaller the recommendation value.

In a specific application scenario, determination module 323 can further be configured to: multiply the first recommendation value by a weight corresponding to the first recommendation value, and add the product obtained to the product of the second recommendation value timing a weight corresponding to the second recommendation value and the product of the third recommendation value timing a weight corresponding to the third recommendation value, and further determine the sum obtained as the resulting recommendation value of each AZ of the load balancing system for serving as the corresponding primary AZ of the load balancing instance.

In a specific application scenario, determination module 323 can further be configured to: determine the AZ with the highest resulting recommendation value, or an AZ with the resulting recommendation value higher than a preset threshold recommendation value as the AZ suitable to serve as the corresponding primary AZ of the load balancing instance.

In a specific application scenario, as illustrated in FIG. 6, the device further includes a distribution unit 34 configured to pre-distribute a network segment route from the load balancing device to which the load balancing instance belongs to a corresponding router of the load balancing device, by means of configuring a static equivalent route.

Switching unit 33 can be specifically configured to: switch the primary AZ of the load balancing instance to the AZ indicated in the determined result by adjusting the preference values attached to the corresponding 32-bit route of the load balancing instance when the router is distributing this 32-bit route to the backbone network routers, where the backbone network routers of different AZs are connected through DCI channels.

For other description of various functional units involved in the device for optimizing load balancing based on cloud monitoring in accordance with this embodiment, reference can be made to the corresponding description in relation to FIG. 1 and FIG. 2, and so details are not to be given herein again.

Based on the foregoing methods illustrated in FIG. 1 and FIG. 2, embodiments of the present application further provides a storage device that stores a computer program that when executed by a processor performs the above-described methods for optimizing load balancing based on cloud monitoring illustrated in FIG. 1 and FIG. 2.

Based on the foregoing methods illustrated in FIG. 1 and FIG. 2 and the virtual device embodiments illustrated in FIG. 5 and FIG. 6, in order to fulfill the objective described supra, embodiments of the present application further provide a physical apparatus for optimizing load balancing based on cloud monitoring. The physical apparatus includes a storage device and a processor. The storage device stores a computer program. The processor executes the computer program to perform the methods for optimizing load balancing based on cloud monitoring illustrated in FIG. 1 and FIG. 2.

With the technical solutions of the present application, the primary/backup AZ switchover efficiency of a load balancing instance can be improved by intelligently switching the preferences of load balancing devices so that services can be migrated to the AZ as appropriate. Furthermore, misoperations can be avoided improving the primary/backup AZ switchover accuracy of the load balancing instance and saving system resources.

Through the foregoing description of the embodiments, those having skill in the art will be able to clearly understand that the present application may be implemented by hardware or by means of software plus a necessary universal hardware platform. Based on such an understanding, the technical solution of the present application may be embodied as software products. Software products can be stored in a non-transitory storage medium (e.g., a CD-ROM, a USB flash drive, a removable hard disk drive) and may include multiple instructions that when executed can cause a computing device (e.g., a personal computer, a server, a network device), to perform the methods as described in the various implementation scenarios of the present application.

Those having skill in the art can understand that the accompanying drawings are merely schematic diagrams of some illustrative implementation scenarios, and that various modules or processes illustrated in the accompanying drawings are not necessarily required to practice the present application.

It will be appreciated by those having skill in the art that various modules of a device in an implementation scenario may be distributed in a device in accordance with the description of the implementation scenario, or can also be appropriately changed to reside in one or more devices different from the present implementation scenario. The modules of the above implementation scenario can be combined into one module, or can also be further split into multiple sub-modules.

Sequence numbers as used in the present application are intended for illustrative purposes only, and are not indicative of the advantages and disadvantages of the relevant embodiments.

The above disclosure portrays merely a few specific implementation scenarios of the present application. The present application, however, will not be limited thereto, and any changes that can be contemplated by those having in the art shall all fall within the scope of the present application.

What is claimed is:
1. A method for optimizing load balancing based on cloud monitoring, comprising:
obtaining: statistics on traffic distribution within a controlled area of a load balancing system; statistics on backend servers within a plurality of Availability Zones (AZ's) of the load balancing system; and monitored network quality of the plurality of AZs;
obtaining an exit bandwidth of each of the plurality of AZs of the load balancing system and an average bandwidth used at a public network exit corresponding to each AZ based on the traffic distribution statistics, and computing a first recommendation value of each AZ of the load balancing system for serving as the corresponding primary AZ of the load balancing instance based on the exit bandwidth and the average bandwidth used at the public network exit;
computing a second recommendation value of each AZ of the load balancing system for serving as the corresponding primary AZ of the load balancing instance, based on the backend server statistics;

computing a third recommendation value of each AZ of the load balancing system for serving as the corresponding primary AZ of the load balancing instance, based on the monitored network quality;

determining a resulting recommendation value of each AZ of the load balancing system for serving as the corresponding primary AZ of the load balancing instance, based on the first recommendation value, the second recommendation value, the third recommendation value, and respective weights of the three recommendation values;

determining the AZ suitable to serve as the corresponding primary AZ of the load balancing instance based on the resulting recommendation value; and performing a primary/backup AZ switchover of the load balancing instance in accordance with the determined result.

2. The method according to claim 1, wherein computing the first recommendation value of each AZ of the load balancing system for serving as the corresponding primary AZ of the load balancing instance comprises:

dividing the average bandwidth used at the public network exit corresponding to the AZ by the exit bandwidth of the AZ to obtain a traffic usage rate of the AZ;

multiplying a total bandwidth of the AZ by a preset coordination factor coefficient to obtain a corresponding weight of the AZ; and determining the first recommendation value of each AZ of the load balancing system for serving as the corresponding primary AZ of the load balancing instance by the following principle: the lower the traffic usage rate the higher the recommendation value, and the heavier the weight the higher the recommendation value.

3. The method according to claim 1, wherein obtaining the backend server statistics within the plurality of AZs of the load balancing system comprises:

determining the number of backend servers operating in their preset normal state in each AZ by a health check on the backend servers; and determining the backend server statistics within the plurality of AZs of the load balancing system based on the number; and wherein computing the second recommendation value of each AZ of the load balancing system for serving as the corresponding primary AZ of the load balancing instance based on the backend server statistics comprises:

determining the second recommendation value of each AZ of the load balancing system for serving as the corresponding primary AZ of the load balancing instance by the following principle: the greater the number, the higher the recommendation value.

4. The method according to claim 1, wherein computing the third recommendation value of each AZ of the load balancing system for serving as the corresponding primary AZ of the load balancing instance based on the monitored network quality comprises:

counting the number of times network quality parameters of each AZ go abnormal during an operation period based on operation data of the monitored network quality; and determining the third recommendation value of each AZ of the load balancing system for serving as the corresponding primary AZ of the load balancing instance by the following principle: the higher the number of abnormalities, the lower the recommendation value.

5. The method according to claim 1, wherein determining the resulting recommendation value of each AZ of the load balancing system for serving as the corresponding primary AZ of the load balancing instance based on the first recommendation value, the second recommendation value, the third recommendation value, and respective weights of the three recommendation values comprises:

summing a product of the first recommendation value timing a weight corresponding to the first recommendation value, a product of the second recommendation value timing a weight corresponding to the second recommendation value, and a product obtained of the third recommendation value timing a weight corresponding to the third recommendation value, to obtain a sum total; and determining the sum total as the resulting recommendation value of each AZ of the load balancing system for serving as the corresponding primary AZ of the load balancing instance.

6. The method according to claim 1, wherein determining the AZ suitable to serve as the corresponding primary AZ of the load balancing instance based on the resulting recommendation value comprises:

determining the AZ with the highest resulting recommendation value, or an AZ with the resulting recommendation value greater than a preset threshold recommendation value as the AZ suitable to serve as the corresponding primary AZ of the load balancing instance.

7. The method according to claim 1, further comprising, prior to performing the primary/backup AZ switchover of the load balancing instance in accordance with the determined result:

pre-distributing a network segment route from a load balancing device to which the load balancing instance belongs to a corresponding router of the load balancing device, by means of configuring a static equivalent route;

wherein performing the primary/backup AZ switchover of the load balancing instance in accordance with the determined result comprises:

switching the primary AZ of the load balancing instance to the AZ indicated in the determined result by adjusting preference values attached to a corresponding 32-bit route of the load balancing instance when the router is distributing the 32-bit route to backbone network routers, where the backbone network routers of different AZs are connected through Datacenter Interconnection (DCI) channels.

8. A storage device storing a computer program that when executed by a processor performs a method for optimizing load balancing based on cloud monitoring, the method comprising:

obtaining: statistics on traffic distribution within a controlled area of a load balancing system; statistics on backend servers within a plurality of Availability Zones (AZ's) of the load balancing system; and monitored network quality of the plurality of AZs;

obtaining an exit bandwidth of each of the plurality of AZs of the load balancing system and an average bandwidth used at a public network exit corresponding to each AZ based on the traffic distribution statistics, and computing a first recommendation value of each AZ of the load balancing system for serving as the corresponding primary AZ of the load balancing instance based on the exit bandwidth and the average bandwidth used at the public network exit;

computing a second recommendation value of each AZ of the load balancing system for serving as the corresponding primary AZ of the load balancing instance, based on the backend server statistics;

computing a third recommendation value of each AZ of the load balancing system for serving as the corresponding primary AZ of the load balancing instance, based on the monitored network quality;

determining a resulting recommendation value of each AZ of the load balancing system for serving as the corresponding primary AZ of the load balancing instance, based on the first recommendation value, the second recommendation value, the third recommendation value, and respective weights of the three recommendation values;

determine the AZ suitable to serve as the corresponding primary AZ of the load balancing instance based on the resulting recommendation value; and performing a primary/backup AZ switchover of the load balancing instance in accordance with the determined result.

9. The storage device according to claim 8, wherein the computer program when executed by the processor causes the following operations to be performed in computing the first recommendation value of each AZ of the load balancing system for serving as the corresponding primary AZ of the load balancing instance:

dividing the average bandwidth used at the public network exit corresponding to each AZ by the exit bandwidth of the AZ to obtain a traffic usage rate of the AZ;

multiplying a total bandwidth of the AZ by a preset coordination factor coefficient to obtain a corresponding weight of the AZ; and determining the first recommendation value of each AZ of the load balancing system for serving as the corresponding primary AZ of the load balancing instance by the following principle: the lower the traffic usage rate the higher the recommendation value, and the heavier the weight the higher the recommendation value.

10. The storage device according to claim 8, wherein the computer program when executed by the processor causes the following operations to be performed in obtaining the backend server statistics within the plurality of AZs of the load balancing system:

determining the number of backend servers operating in their preset normal state in each AZ by a health check on the backend servers; and determining the backend server statistics within the plurality of AZs of the load balancing system based on the number; and wherein computing the second recommendation value of each AZ of the load balancing system for serving as the corresponding primary AZ of the load balancing instance comprises:

determining the second recommendation value of each AZ of the load balancing system for serving as the corresponding primary AZ of the load balancing instance by the following principle: the greater the number, the higher the recommendation value.

11. An apparatus for optimizing load balancing based on cloud monitoring, comprising a storage device, a processor, and a computer program stored on the storage device and executable by the processor, wherein the processor is configured to execute the computer program to perform a method for optimizing load balancing based on cloud monitoring, the method comprising:

obtaining: statistics on traffic distribution within a controlled area of a load balancing system; statistics on backend servers within a plurality of Availability Zones (AZ's) of the load balancing system; and monitored network quality of the plurality of AZs;

obtaining an exit bandwidth of each of the plurality of AZs of the load balancing system and an average bandwidth used at a public network exit corresponding to each AZ based on the traffic distribution statistics, and computing a first recommendation value of each AZ of the load balancing system for serving as the corresponding primary AZ of the load balancing instance based on the exit bandwidth and the average bandwidth used at the public network exit;

computing a second recommendation value of each AZ of the load balancing system for serving as the corresponding primary AZ of the load balancing instance, based on the backend server statistics;

computing a third recommendation value of each AZ of the load balancing system for serving as the corresponding primary AZ of the load balancing instance, based on the monitored network quality;

determining a resulting recommendation value of each AZ of the load balancing system for serving as the corresponding primary AZ of the load balancing instance, based on the first recommendation value, the second recommendation value, the third recommendation value, and respective weights of the three recommendation values;

determine the AZ suitable to serve as the corresponding primary AZ of the load balancing instance based on the resulting recommendation value; and performing a primary/backup AZ switchover of the load balancing instance in accordance with the determined result.

12. The apparatus according to claim 11, wherein the computer program when executed by the processor causes the following operations to be performed in computing the first recommendation value of each AZ of the load balancing system for serving as the corresponding primary AZ of the load balancing instance:

dividing the average bandwidth used at the public network exit corresponding to each AZ by the exit bandwidth of the AZ to obtain a traffic usage rate of the AZ;

multiplying a total bandwidth of the AZ by a preset coordination factor coefficient to obtain a corresponding weight of the AZ; and determining the first recommendation value of each AZ of the load balancing system for serving as the corresponding primary AZ of the load balancing instance by the following principle: the lower the traffic usage rate the higher the recommendation value, and the heavier the weight the higher the recommendation value.

13. The apparatus according to claim 11, wherein the computer program when executed by the processor causes the following operations to be performed in obtaining the backend server statistics within the plurality of AZs of the load balancing system:

determining the number of backend servers operating in their preset normal state in each AZ by a health check on the backend servers; and determining the backend server statistics within the plurality of AZs of the load balancing system based on the number; and wherein computing the second recommendation value of each AZ of the load balancing system for serving as the corresponding primary AZ of the load balancing instance comprises:

determining the second recommendation value of each AZ of the load balancing system for serving as the corresponding primary AZ of the load balancing instance by the following principle: the greater the number, the higher the recommendation value.

14. The apparatus according to claim 11, wherein the computer program when executed by the processor causes the following operations to be performed in computing the third recommendation value of each of the load balancing system for serving as the corresponding primary AZ of the load balancing instance based on the monitored network quality:
    counting the number of times network quality parameters of each AZ go abnormal during an operation period based on operation data of the monitored network quality; and
    determining the third recommendation value of each AZ of the load balancing system for serving as the corresponding primary AZ of the load balancing instance by the following principle: the higher the number of abnormalities, the lower the recommendation value.

15. The apparatus according to claim 11, wherein the computer program when executed by the processor causes the following operations to be performed in determining the resulting recommendation value of each AZ of the load balancing system for serving as the corresponding primary AZ of the load balancing instance:
    summing a product of the first recommendation value timing a weight corresponding to the first recommendation value, a product of the second recommendation value timing a weight corresponding to the second recommendation value, and a product of the third recommendation value timing a weight corresponding to the third recommendation value, to obtain a sum total; and
    determining the sum total as the resulting recommendation value of each AZ of the load balancing system for serving as the corresponding primary AZ of the load balancing instance.

16. The apparatus according to claim 11, wherein the computer program when executed by the processor causes the following operations to be performed in determining the AZ suitable to serve as the corresponding primary AZ of the load balancing instance based on the resulting recommendation value:
    determining the AZ with the highest resulting recommendation value, or an AZ with the resulting recommendation value greater than a preset threshold recommendation value as the AZ suitable to serve as the corresponding primary AZ of the load balancing instance.

17. The apparatus according to claim 11, wherein the computer program when executed by the processor further causes the following operations to be performed, prior to performing the primary AZ switchover of the load balancing instance in accordance with the determined result:
    pre-distributing a network segment route from a load balancing device to which the load balancing instance belongs to a corresponding router of the load balancing device, by means of configuring a static equivalent route;
    wherein performing the primary/backup AZ switchover of the load balancing instance in accordance with the determined result comprises:
    switching the primary AZ of the load balancing instance to the AZ indicated in the determined result by adjusting preference values attached to a corresponding 32-bit route of the load balancing instance when the router is distributing the 32-bit route to backbone network routers, where the backbone network routers of different AZs are connected through Datacenter Interconnection (DCI) channels.

\* \* \* \* \*